Nov. 3, 1942.   E. KRAMP ET AL   2,301,125
APPARATUS FOR VULCANIZING FLOOR MATS
Filed Aug. 3, 1940   2 Sheets-Sheet 1

Inventor
Edward Kramp and
Karl B. Kilborn

By
Attorney

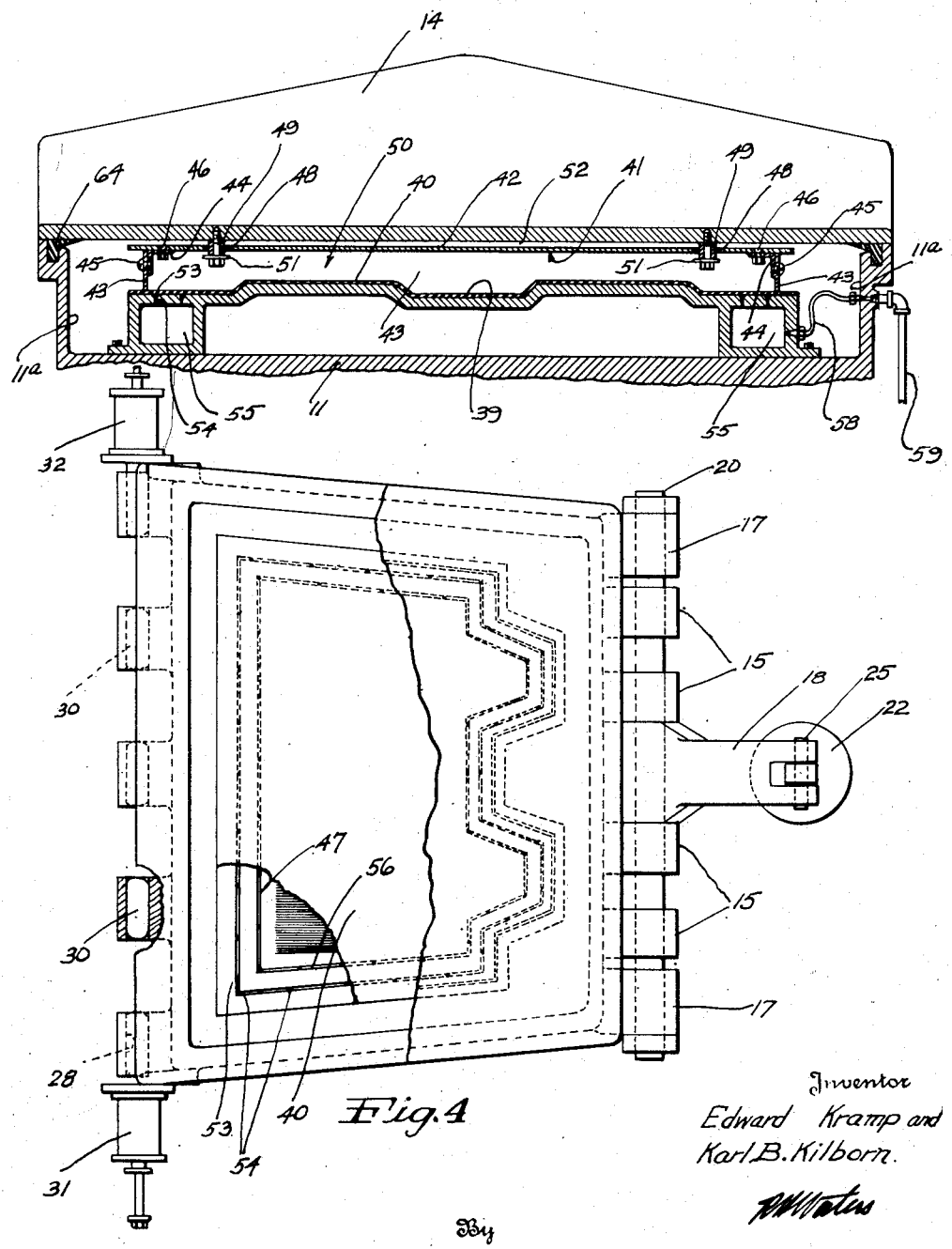

Patented Nov. 3, 1942

2,301,125

UNITED STATES PATENT OFFICE 2,301,125

APPARATUS FOR VULCANIZING FLOOR MATS

Edward Kramp, Akron, and Karl B. Kilborn, Fairlawn, Ohio, assignors to Wingfoot Corporation, Wilmington, Del., a corporation of Delaware Application August 3, 1940, Serial No. 350,564

11 Claims. (Cl. 18—19)

This invention relates to vulcanizers and more particularly to vulcanizers for curing relatively thin sheet material, which may be substantially flat or of irregular contour such as pads or mats, and is of special utility in curing mats used to cover floors in automobiles.

In this invention it is proposed to cure articles of this nature by placing the material over a form positioned in a curing chamber and applying the curing medium directly to the exposed surface without the aid of a mold, die or other backing member. In curing articles of this nature by this method it is essential to have a fluid tight seal around the edges of the material so that the vulcanizing medium will not find its way between the articles and the form over which it is positioned. The vulcanizer as illustrated in this invention is unique in its construction in that the entire curing chamber is formed in the lower part thereof. The lid is hingedly mounted to the lower part of the vulcanizer and when opening and closing swings through an arc about the pivot point of the hinge. The under surface or bottom of the lid is simply a plane surface to which the edge sealing means for the sheet material is readily attached. The lid also forms a seal for the curing chamber by resting upon a feather-edged gasket which is fitted into a groove in the upper edges of the metal which forms the walls of the curing chamber.

One of the main objects of this invention is to provide a box-like member with perforated walls that will form a perfect seal around the outer edges of a mat which will prevent the vulcanizing medium such as steam or water, from finding its way between the article being vulcanized and the form upon which it is positioned.

Another object is to eliminate the use of manually operated and complicated clamping mechanism by providing a device for sealing automatically, the outer edges of the articles that is to be vulcanized, and one which requires no attention from the operator whatever, thus eliminating the hazard of injury to the operator and saving his time as well.

The sealing device is loosely suspended from the under side of the lid or cover of the vulcanizer and automatically takes its place as a sealing means when the lid of the vulcanizer is closed and the lower edges of the box-like sealing device rest upon the outer edges of the article being vulcanized where it seals the edges of the article by merely resting upon same of its own weight thus preventing the vulcanizing medium from finding its way between the article and the supporting form. This form upon which the mat or other sheet articles are vulcanized is made of metal and its upper face, upon which the article to be vulcanized is positioned, may be provided with any desired design. The form is usually of an irregular contour, and in order to prevent air or steam from seeping and becoming trapped beneath the sheet material, a marginal groove is provided on the upper face of the form, said groove communicating with vent holes which permit any such trapped fluid to escape to the atmosphere. It is obvious that if this trapped fluid is not allowed to escape a perfect imprint of the design will not be obtained.

The simplicity and advantage of this vulcanizing device will be more fully appreciated from the following description especially when considered in connection with the accompanying drawings, in which:

Fig. 3 is an enlarged transverse sectional view taken approximately on the line 3—3 of Fig. 1;

Fig. 4 is a plan view with parts broken away.

Figure 1:
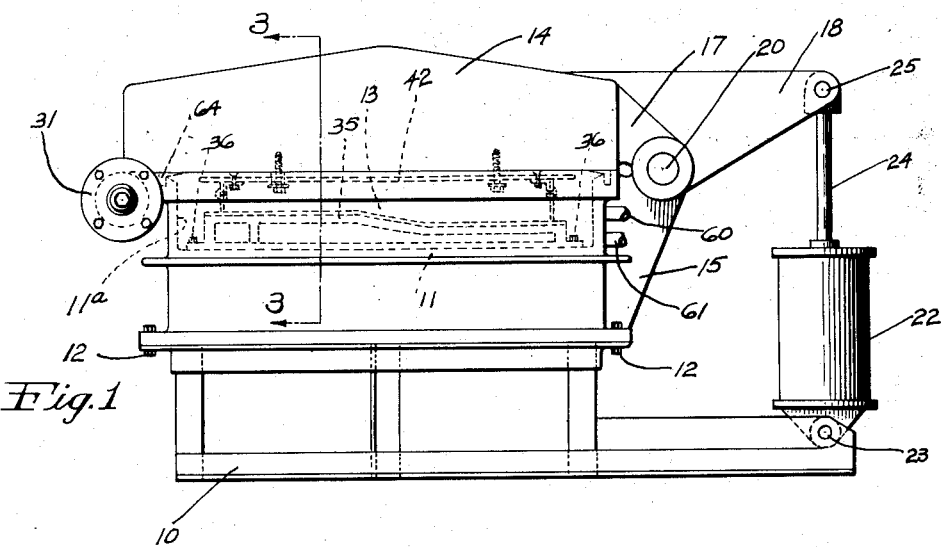
Fig. 1 is a side elevation of one form of vulcanizer embodying the invention and showing it in closed position.

Referring now to the drawings in detail, it will be seen that the vulcanizer consists of a frame 10 upon which is mounted a vulcanizing base plate or bed plate 11 and attached thereto by bolts 12. Rising from the edge portions of the base 11 there are upwardly extending walls 11-a which define a vulcanizing chamber 13. A lid 14 serves to close the vulcanizing chamber 13 when desired. Extending rearwardly from the outer wall 11-a of the vulcanizing chamber there are a plurality of lugs 15 terminating in rounded ends with horizontally alined bores, said lugs interfitting with similar lugs 17 and a central lug or arm 18 associated with the lid 14. The lugs 17 and the arm 18 are formed with bores adapted for alinement with those in the lugs 15 to receive a hinge pin 20 through the medium of which the vulcanizer is opened and closed. Any suitable power means may be employed for actuating the lid, such means being illustrated as including a pressure cylinder 22 which is pivotally connected at 23 to the frame 10 and a piston rod 24, the outer end of which is pivotally attached at 25 to the arm 18.

The vulcanizer lid 14 may be locked in closed position by any suitable locking means. Thus in the illustrated embodiment, a plurality of lugs 26 and 27 adjacent the front edges of the base plate 11 and lid 14 are provided with bored holes 28 and 29 containing tumblers 30. These tumblers 30 are pushed endwise across the intersecting lines of the lugs into locking position and returned therefrom by the action of air cylinders 31 and 32. This locking device is shown and described in Patent No. 2,028,078 and is not herein claimed, and it is to be understood that other forms of locking devices may be used instead.

The form upon which the sheet material is vulcanized comprises a casting 35 secured in the bottom of the vulcanizing chamber 13 by the cap screws 36. It will be noted that the top of the form is shown with irregular contour, the forward surface 37 being of greater elevation than the rearward surface 38 (see Fig. 2) and the surface 37 being provided with a central depression 39 (see Fig. 3). Of course, the invention may be used for curing flat mats as well as contoured mats, and in either case, the upper surface of the vulcanizing form may be engraved or otherwise provided with a preferred design.

When a sheet 40 of rubber or similar material is placed over the form 35 for vulcanizing, it is necessary to seal the outer edges of the sheet material 40 against the outer edges of the form, thus to prevent the vulcanizing fluid from finding its way between the sheet of material and the upper surface of the form. If this is not done, a perfect imprint of the design is not obtained and the material will have to be scrapped causing a substantial economic loss. In order to overcome this hazard, a very simple form of sealing means 41 is provided, it being carried by the lid 14. The device is of box-like construction and consists of a polygonal metal plate 42 of substantially the same outline as the form 35, having around its outer edge and at right angle thereto downwardly extending metal plates or sealing elements 43 which are attached through the aid of angle bars 44 and bolts 45 and 46. These sealing elements may be formed of sheet metal provided with openings 47, expanded metal or wire mesh, but it has been found that sheet material serves the purpose well. The openings 47 in the plates 43 are essential to allow the vulcanizing fluid to penetrate freely over the surface of the sheet material which for the greater part lies surrounded by the clamping device 41. The lower or free edges of the plates or sealing elements 43 are rounded and are formed to fit the contour of the form and rest upon the edges of the sheet material 40 when the lid of the vulcanizer is closed as shown in Figs. 1 and 3. It will be noted that the box-like sealing device 41 merely rests on the sheet material 40 of its own weight instead of being pressed down by the lid, this being accomplished by the mode of attachment to the lower surface of the lid 14. For this purpose, the plate 42 is provided with openings 48 (see Fig. 3) adjacent each corner to receive bushings 49, over which the sealing device will be able to slide freely between washers 51 and the bottom of the lid 14. When the lid is closed there will remain a space 52 between the plate 42 and the under side of the lid 14 due to the fact that the bushings are of greater length than the thickness of the plate 42 which permits the sealing device 41 to rest of its own weight with the lower edges of the plates 43 in contact with the edges of the sheet material 40 providing a positive and effective seal. By thus mounting the sealing device 50 in slidable relation with the lid 14, there will be no danger of the plates 43 cutting too deeply into the sheet material at any one point because it will not at any time be under force other than gravity.

Figure 2:
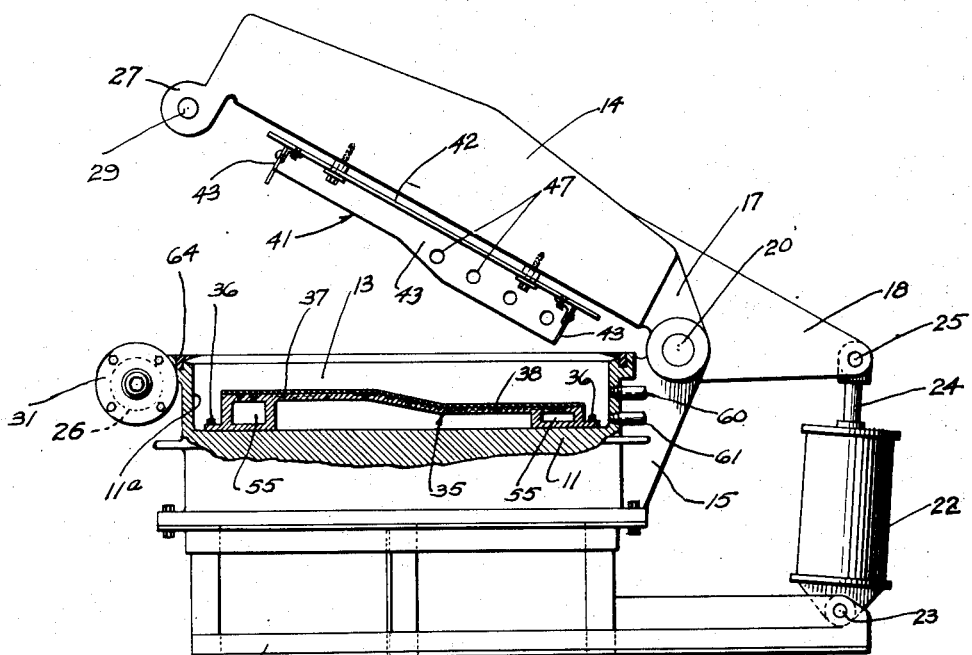
Fig. 2 is a similar view showing the vulcanizer opened, and with parts broken away and parts in section.

In order to prevent trapped air or steam from remaining between the upper surface of the form 35 and the sheet material 40 during vulcanization, the form is provided with a V-shaped groove 53 which extends completely around the outer edge closely adjacent the inner wall of the clamping device, and vent holes 54 connect this groove with a chamber 55 which also extends around the edges of the form as best shown in Figs. 2 and 3. This vent groove 53 has nothing to do with the design of the finished product. Additional venting means is provided by a second groove 56 which is parallel to groove 53 and inwardly thereof which does form a part of the design as a head or dividing line between the central design and the outer edge of the finished product. This groove 67 is also connected to the venting chamber 55 by holes 57. To complete the venting of the under side of the sheet material to the atmosphere a flexible tube 58, which is capable of being adjusted to fit different sizes of forms is connected to the venting chamber 55 and extends to the vulcanizing chamber wall and through an opening therein which communicates with a pipe 59 which discharges the vented fluid to the atmosphere. At the start of the operation, the groove 53 also serves to prevent air or vapor in the form of condensed steam from being trapped in the depressions of the design in the form. When the vulcanizing fluid is admitted under pressure to the vulcanizing chamber, it takes approximately thirty seconds for the pressure to build up to maximum and during this time any trapped fluid beneath the sheet material will be forced into the groove 53 and allowed to escape and at the same time the vulcanizable material will be pressed tightly over the groove and form an additional seal to prevent additional fluid from accidentally finding its way underneath the material.

The curing chamber 13 is provided with an inlet 60 for admitting fluid under pressure as a vulcanizing medium and an outlet 61, and is secured against leaks around the dividing line of the chamber 13 and lid 14 by a rubber gasket 64.

From the foregoing description it will be apparent that this invention provides a simplified apparatus for vulcanizing sheet material and one in which the sealing means is operated automatically by the opening and closing of the lid of the vulcanizer and one which requires no springs or other means to force it into contact with the material being vulcanized. In operation the attendant spreads a sheet of vulcanizable material 40 over the form 35 while the vulcanizer is open as shown in Fig. 2 and it will be noted that the sealing means 41 being slidably suspended from the under side of the lid 14 is raised out of the way by the upward movement of said lid. When the sheet of material is properly positioned over the form the operator opens a valve to admit pressure fluid to the lower end of cylinder 22, whereupon the vulcanizer lid closes lowering the edge sealing means and positioning the sealing plates 43 upon the edges of the sheet material 40 where they rest of their own weight to form the seal. Then the lid 14 is locked in closed position and steam, hot air, or other curing medium under pressure is admitted to the interior of the vulcanizing chamber through the inlet 60. The curing medium then exerts its pressure and transfers heat to the mat 40 or other sheet material supported on the form 41 to vulcanize the same, causing the design on the form surface to be molded in reverse on the engaging surface of the mat, said engaging surface ultimately becoming the upper surface of the mat in use. After the cure has continued for a predetermined time, the supply of vulcanizing fluid is discontinued, the lid unlocked and raised, and the cured mat removed, leaving the apparatus ready for repetition of the operation. These various control steps may be effected manually if desired, but in large production they will preferably be effected by automatic cycle control mechanism which is not shown in the drawings but well known to those skilled in the art.

Although we have shown and described only one form of the invention by way of illustration, it will be understood that various modifications and changes may be made without departing from the spirit of the invention or the scope of the appended claims.

We claim:

1. An apparatus for vulcanizing sheet material comprising a vulcanizing chamber having a single cavity and a lid, a form mounted in the bottom of said chamber upon which the sheet material is vulcanized to a predetermined form, means to seal the outer edges of the sheet material against the outer edges of the form, said sealing means being slidably suspended from the bottom of the lid and moved toward and away from the sheet material by the action of the lid while opening and closing the vulcanizing chamber, and means for venting the under side of the sheet material through a venting chamber in the form to the atmosphere.

2. An apparatus for vulcanizing sheet material comprising a vulcanizing chamber and a lid hingedly attached thereto, a form mounted in the bottom of the vulcanizing chamber upon which sheet material is vulcanized to a shape corresponding to the contour of the form, means for admitting fluid under pressure to the vulcanizing chamber in direct contact with the sheet material, means for sealing the outer edges of the sheet material against the corresponding edges of the form, said sealing means being slidably attached to the bottom of the lid and moved into and out of contact with the sheet material by the movement of the lid while opening and closing the vulcanizer, and means for venting the meeting surfaces of the sheet material and the form to the atmosphere.

3. A vulcanizer for vulcanizing sheet material comprising a vulcanizing chamber and a lid hingedly attached thereto, a form attached to the bottom of said chamber upon which the sheet material is vulcanized, means for admitting fluid under pressure to the vulcanizing chamber in direct contact with the sheet material, means for automatically sealing the outer edges of the sheet material against the corresponding edges of the form, said sealing means being slidably suspended from the bottom of the lid and adapted for movement toward and away from the sheet material by the opening and closing of the lid, and means for venting the under side of said sheet material to the atmosphere to allow trapped fluid to escape.

4. An apparatus for vulcanizing sheet material comprising a vulcanizing chamber and a lid hingedly attached thereto, a form attached to the bottom of said chamber upon which the sheet material is vulcanized, means for admitting fluid under pressure in direct contact with the sheet material, means for automatically sealing the outer edges of the sheet material against the corresponding edges of the form, said sealing means being slidably suspended from the bottom of the lid and moved toward and away from the sheet material by the opening and closing of the lid and when in sealing position resting of its own weight on the edges of the sheet material, and a venting means to prevent trapped fluid from remaining beneath the surface of the sheet material.

5. An apparatus for vulcanizing sheet material to an irregular contour comprising a vulcanizing chamber and a lid in hinged relation thereto, a form of irregular contour attached to the bottom of said chamber over which a sheet of material is to be vulcanized, means for admitting fluid under pressure to the chamber and in direct contact to the upper exposed surface of the sheet material, an edge sealing means suspended from the bottom of the lid and automatically positioned by the closing action of the lid, and means for allowing trapped fluid to escape from beneath the sheet material to the atmosphere.

6. An apparatus for vulcanizing sheet material to an irregular contour comprising a vulcanizing chamber, a lid for said chamber the bottom of which has a plane surface, a form attached to the bottom of said vulcanizing chamber and over which the sheet material is positioned, an edge sealing means slidably suspended from the bottom of the lid, said sealing means being automatically moved into and out of contact with the outer edges of the sheet material by the action of the lid, and venting means to connect the underside of the sheet material at various points to the atmosphere.

7. An apparatus for vulcanizing contoured floor mats and the like comprising a vulcanizing chamber, a lid for said chamber the bottom of which has a plane surface, a form attached to the bottom of said chamber and over which the floor mat is positioned for vulcanization, an edge sealing means slidably suspended from the bottom of said lid said sealing means being automatically movable into and out of operative position by the action of the lid and resting by gravity while in sealing position, and venting means to allow trapped fluid to escape from beneath the sheet material to the atmosphere.

8. An apparatus for vulcanizing rubber floor mats over a form of irregular contour, comprising a single cavity vulcanizing chamber, a lid for covering said chamber, a form provided with vent holes attached to the bottom of the vulcanizing chamber over which the floor mats are positioned, means for connecting said vent holes to the atmosphere, and an edge sealing means slidably suspended from the bottom of the lid and automatically positioned by closing said lid so that it provides a seal by resting of its own weight closely adjacent the edges of the sheet material.

9. In a vulcanizing apparatus for vulcanizing sheet material such as mats the combination of a vulcanizer lid movable to opened and closed positions, an edge sealing device for sealing the edge of the sheet material against a corresponding surface of a form disposed below said lid, said sealing device being carried by the lid and having limited movement relative thereto and when the lid is closed said sealing means resting by gravity in sealing position on the sheet material.

10. In a vulcanizing apparatus for vulcanizing sheet material, a vulcanizing form for supporting a sheet material to be vulcanized, said form having a plurality of vent holes, a lid movable toward and from the form to closed and opened positions, a sealing device to seal the edges of the sheet material against a corresponding surface of the form, said sealing device being carried by the lid and having limited movement relative thereto and when in sealing position resting of its own weight on the sheet material, and means to connect the vent holes in the form to the atmosphere.

11. In a vulcanizing apparatus of the class described, a single cavity pressure chamber, a lid hingedly attached thereto, a form of irregular contour attached to the bottom of said chamber adapted to mold a sheet of vulcanizable material, a venting means for said form comprised of a marginal groove and a venting chamber, openings connecting said groove with said chamber, and means to connect said chamber to the atmosphere, and a marginal sealing means suspended from the bottom of the lid said sealing means being automatically positioned by the closing of the lid upon the marginal edge of the sheet material and resting of its own weight thereon.

EDWARD KRAMP.
KARL B. KILBORN.